United States Patent [19]
Heinrichs et al.

[11] Patent Number: 5,867,284
[45] Date of Patent: Feb. 2, 1999

[54] DEVICE FOR CORRECTING THE CHROMATICITY OF COLOR PICTURES RECORDED BY A VIDEO CAMERA

[75] Inventors: Jean-Pierre Heinrichs, Bretten; Michael Vögele, Kämpfelbach-Ersingen; Ulrich Häfele, Oberderdingen, all of Germany

[73] Assignee: Richard Wolf GmbH, Knittlingen, Germany

[21] Appl. No.: 694,737

[22] Filed: Aug. 9, 1996

[30] Foreign Application Priority Data

Aug. 10, 1995 [DE] Germany ............... 195 29 366.5

[51] Int. Cl.⁶ ............... H04N 1/46; H04N 5/225; G03F 3/08
[52] U.S. Cl. ............... 358/516; 358/518; 358/909.1; 348/45; 348/65; 348/223; 382/128; 382/167
[58] Field of Search ............... 358/909.1, 401, 358/516, 518; 348/223, 225, 45, 65, 73; 382/128, 167, 254

[56] References Cited

U.S. PATENT DOCUMENTS 4,774,564  9/1988  Konishi ............... 348/224
4,951,134  8/1990  Nakasima et al. .
5,016,094  5/1991  Kaneko ............... 348/226
5,111,281  5/1992  Sekiguchi .

FOREIGN PATENT DOCUMENTS

4106305 A1  9/1992  Germany .
5-293081  11/1993  Japan ............... H04N 9/04

*Primary Examiner*—Kim Yen Vu
*Assistant Examiner*—Kimberly A. Williams
*Attorney, Agent, or Firm*—Panitch Schwarze Jacobs & Nadel, P.C.

[57] ABSTRACT

The invention relates to a device for correcting the tone of color pictures recorded by a video camera, in particular an endoscope camera. A control device works in combination with a preferably triangular keyboard so that a free tone correction of the three ground colors of the video picture may be effected independently of the color temperature of the recorded object, i.e. in particular, independently of the light source employed. The switching surface is in the form of a surface PAD keyboard which allows the evaluation of the location of a finger tip or likewise at any position on the triangle, and thus represents a very effective input medium for the tone correction according to the invention. A similarly provided automatic white balancing function permits the white point of the camera color space to lie in the surface center of the surface PAD keyboard.

7 Claims, 4 Drawing Sheets

DEVICE FOR CORRECTING THE CHROMATICITY OF COLOR PICTURES RECORDED BY A VIDEO CAMERA

BACKGROUND OF THE INVENTION

The invention relates to a device for correcting the chromaticity of color pictures recorded by a video camera, in particular an endoscope camera, with the video camera comprising a converts which converts a record picture into an electrical color picture signal. A control device is provide to selectively control the chromaticity of the color picture which is displayed on a monitor and based on the recorded picture, independently of the displayed color picture wherein the control device includes means for effecting a free chromaticity correction of the three colors (Red, Green and Blue) of the video picture independently of the color temperature of the recorded object.

DESCRIPTION OF THE PRIOR ART

In the past the primary field of application of endoscopy was in diagnosis. In diagnosis the physician observes the hollow organ which is to be examined with the naked eye. The eye has a high brightness and color dynamic, which has the result that the attainable image quality with respect to the definition and color representation is almost entirely dependent on the endoscope employed.

In surgery however other requirements are required from an endoscopic system than in diagnosis. With a surgical operation, the picture of the operational field must be available to the whole operation team, since several persons carry out the operation work in cooperation.

It is not therefore sufficient to observe the operational field through an endoscope with the naked eye. For this reason a video camera is placed upon the proximal end of the endoscope or a video endoscope with a distally arranged CCD sensor is applied, so that the operational field can be represented on a monitor. The application of CCD cameras however resulted in few problems since a CCD sensor does not possess the dynamics, sensitivity and the spectral characteristics of the eye. This is of particular relevance where color representation is concerned. One must also strive for the possibility of optimizing the color representation from the point of view of the color deviations occuring in an endoscopic system.

With endoscopic examination of a hollow organ of the body, the endoscope is first inserted into the body cavity or hollow organ which is to be examined. Via optical fibres in the endoscope, illumination light reaches into the body cavity where it illuminates the hollow organ. In order to achieve a genuine color reproduction, the illumination light should not be spectrally influenced by the hollow organ. However it is just exactly this which occurs, according to the type of hollow organ. Part of the illumination light penetrates for example into the mucous membrane, which acts as an absorption filter. In this way, for its part, the mucous membrane acts as a spectral narrow band illumination source, since the penetrated illumination light is filtered and again radiated at the surface of the mucous membrane and the object to be observed for its part is illuminated with red light.

This light absorption behaviour differs according to the hollow organ to be examined. In the region of the joints the light absorption behaviour is not significant, whilst in the stomach where mucous membranes which are heavily supplied with blood are to be found, a color displacement in the direction of red occurs. The strength of the displacement to red depends, given a certain organ, on the observation distance and the observation and illumination angle of the endoscope. The shorter the observation distance or the nearer the endoscope is to the mucous membrane, the stronger the mucous membrane is shined through which leads to a stronger displacement to red.

The U.S. Pat. No. 5,111,281 describes a color correction device for a video endoscope, said device comprising means for determining a color quality of a color image signal and means for carrying out a dynamic color correction in a pixel manner. Due to the correction effected in the pixel manner, the known device is not in the position to differentiate between strong colors occuring point by point, in particular red, and color increases which concern the whole picture, which leads to the result that the known device also corrects color increases occuring point for point and thus has a bad color differentiation.

The U.S. Pat. No. 4,951,134 shows a device for tone correction for an endoscope video camera. With this known device with the help of an input keyboard inputted correction values for the colors blue and red are first converted into digital values and processed into correction values in a microprocessor, and the outputted digital correction values, converted into analogue values using a digital-analogue converter, are used in the form of these analogue values for correction the color signals R and B of the video camera. Furthermore a display is provided on the monitor which quantitatively displays the contents of the chromaticity correction control, i.e. in the form of figures.

SUMMARY OF THE INVENTION

It is the object of the present invention to permit an operator of a video camera equipped with the device according to the invention to simply and completely freely make a chromaticity correction of the video picture, i.e. in particular, independently of the light source employed. Particularly, the device for a chromaticity correction of an endoscope equipped with a video camera should be suitable for the use with an analogue as well as a digital video camera.

One device in which the above object is achieved by a device for correcting the chromaticity of color pictures recorded by a video camera, and in particular an endoscope camera. The camera includes a converter which converts a recorded picture into an electrical color picture signal, and a control device to selectively control the chromaticity of the color picture which is displayed on a monitor and based on the recorded picture, independently of the displayed color picture. The control device includes means for effecting a free chromaticity correction of the three ground colors (Red, Green and Blue ) of the video picture independently of the color temperature of the recorded object.

With one embodiment form, the device for tone correction comprises input means in the form of a contact sensitive, position orientated switching surface, the corner points of which being assigned to the three colors red, green, and blue and correspondingly marked.

This switching surface is, in the preferred embodiment form, designed as a triangular surface PAD keyboard with FSR sensors (force sensing resistors), and the corner points of the triangular surface are each assigned to the color tones RED, GREEN, BLUE.

The video camera comprises means for the selective carrying out of an automatic white balancing, and the control device, after carrying out the white balancing and before carrying out a chromaticity correction, assigns the white point of the surface center as the zero point of the triangular shaped switching surface. This means that the white point is located virtually in the center of the switching surface after automatic white balancing has been carried out. This surface center point may comprise a marking assigned to the white point, e.g. a slightly raised emboss and/or a white point. The above mentioned commercially available surface PAD keyboards have a particular advantage for the intended application in that they can be designed absolutely water tight and are thus, due to hygenic reasons, particularly suitable for the application with endoscope video cameras. By moving for example the finger on and within the switching surface, the operator of the video camera can individually set the desired chromaticity values in the color space, after the white balancing has been carried out, independently of the color temperature of the recorded object.

If the video camera is digitally designed, the control device of the device according to the invention comprises a microprocessor. Then a function of the color correction values for each color, i.e. the dependency of the color correction effected by the control device on the respective location on the surface PAD keyboard contacted by the finger or similar, may be determined by the microprocessor by computing and/or reading out predetermined function values stored in a memory medium.

In one variation, the correction value on effecting the chromaticity correction may depend linearly on the distance from the respective point of the surface PAD keyboard assigned to the corresponding color. Instead of the linear dependency hovewer, another function, e.g. a logarithmic dependency, may be achieved.

BRIEF DESCRIPTION OF THE DRAWINGS

The foregoing indicated features and advantages as well as further features are described in further detail in the subsequent description by way of one embodiment example represented in the drawings. These show.

DETAILED DESCRIPTION OF THE PREFERRED EMBODIMENT

Figure 1:
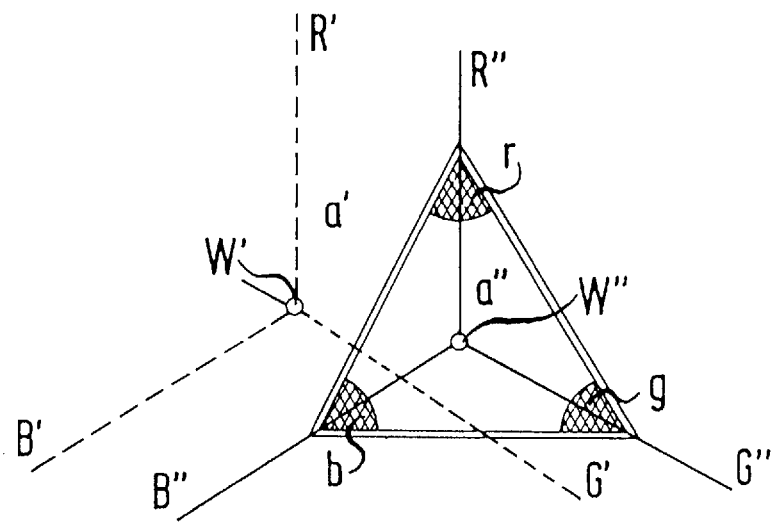
FIG. 1 a color space of a video camera before and after the automatic white balancing, FIG. 2 the assignment of a color space of a color video camera, after automatic white balancing has been effected, to the triangular shaped surface PAD keyboard together with part spherical shaped color variation space, FIGS. 3A, 3B and 3C, three variations of a surface PAD keyboard used for inputting the chromaticity correction, FIG. 4 the modular mimic display of one embodiment form of a device for chromaticity correction according to the invention, FIG. 5 a front panel designed as an operating surface of the device and FIG. 6 a flow diagram of a control procedure with and without automatic white balancing.

For explaining the principle of the chromaticity correction, a rectangular co-ordinate system is shown dashed in FIG. 1, the origin of which being indicated at W' (WHITE') and whose axes are indicated at R' (RED'), G' (GREEN'), and B' (BLUE'). The origin W' (WHITE') of this camera color space a' does not lie at the origin of the standard color space. FIG. 1 further shows a standard color space a" after an automatic white balancing of the video camera and the co-ordinate axes of which, represented by unbroken lines, are indicated with R" (RED"), G" (GREEN"), and B" (BLUE"). With this white balancing the origin of the camera color space is shifted to the origin W" of the standard color space. The triangle of a surface PAD keyboard represented by a double line, given the reference numeral 1, which serves as the input medium for the chromaticity correction, is assigned with the corner zones marked r, g and b respectively to the RED chromaticity correction, the GREEN chromaticity correction and the BLUE chromaticity correction, and provided with corresponding color markings. As shown in FIG. 1, the origin W" of the standard color space after effecting the white balancing lies at the surface center of the triangular surface PAD keyboard 1 (zero point).

Figure 2:
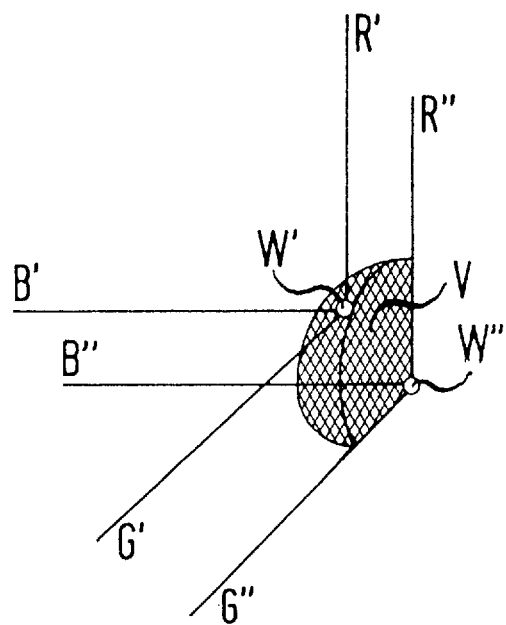

FIG. 2 also represents the camera color space with the axes R' (RED'), G' (GREEN') and B' (BLUE') and the standard color space with the co-ordinate axes R" (RED"), G" (GREEN"), and B" (BLUE"), the origin of which W" being shifted by the white balancing virtually into the surface center point of the surface PAD keyboard 1.

The proposed chromaticity correction allows a free setting of the three ground colors of the video picture, independently of the color temperature of the recorded object, within the spacial segment lying about the origin, and this being ideally within a spherical segment volume V, which may also be an ellipsoidal segment. In FIG. 2, the ideal case of the spherical segment V about the white point W" is shown shaded. A spherical or ellipsoidal segment results because the representation of the white point of the camera color space cannot assume any negative RED, GREEN or BLUE co-ordinate values in the standard color space.

Figure 3A:
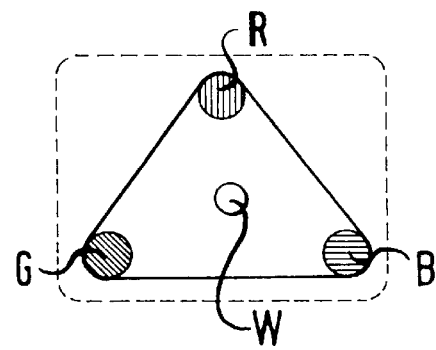
Figure 3B:
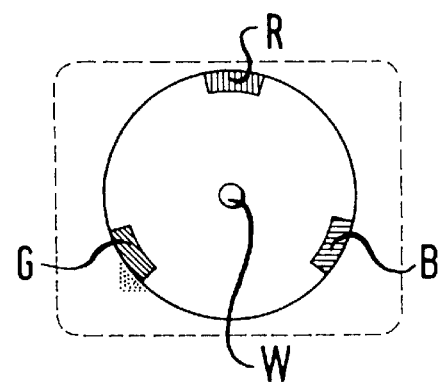
Figure 3C:
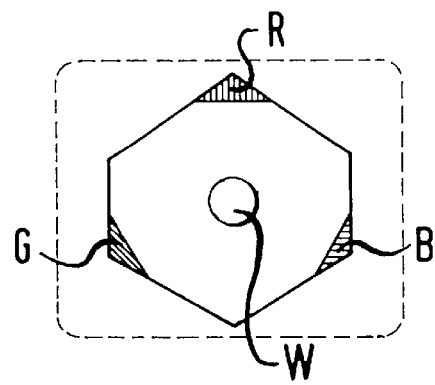

The FIGS. 3A, 3B, and 3C each show a variation of a surface PAD keyboard used as an input medium for inputting a chromaticity correction. In FIG. 3A this has the form of an equilateral triangle, in FIG. 3B a circular form, and in FIG. 3C the form of a regular hexagon. With each of these surface PAD keyboards A, B and C, three points are marked on the periphery corresponding to the ground colors RED, GREEN and BLUE and a central point is marked corresponding to the white point, in particular with a corresponding color marking. The central white point in the surface PAD keyboard is additionally so marked by a raised emboss of the foil that the user retains a contact indication or an orientation.

The surface PAD keyboard used for inputting the chromaticity correction values is a normal input element in its basic design. A surface PAD keyboard formed according to the preferred triangular form permits, when it is provided with a suitable evaluation switching, the determination of the position of a finger tip or likewise or the longitudinal displacement thereof relative to the corners as indicated by the colors at R, G and B, or to the white point, such that a contact on the surface PAD keyboard in the white point W effects no correction, a contact of the surface PAD keyboard 1 on the corner R effects a shifting of the chromaticity in the direction of the axis RED, a contact of the surface PAD keyboard 1 on the corner G effects a shifting of the chromaticity in the direction of the axis GREEN, and a contact of the surface PAD keyboard 1 on the corner B effects a shifting of the chromaticity in the direction of the axis BLUE. A contact of the surface PAD keyboard, e.g. roughly in the middle between the corner R and the corner G at the edge of the surface PAD keyboard effects a resulting shifting of the color space in the direction of an imagined 45° axis in the RED-GREEN plane which is spread by the RED-GREEN axis. In a corresponding manner, the keyboards according to FIGS. 3B and 3C are operated.

These surface PAD keyboards allow, apart from the evaluation of the co-ordinate position of the finger tip or likewise, an evaluation of the pressure force applied, so that the pressure force may additionally be called upon as a measure for a corresponding correction size.

Hereinafter, the adjusting functions f are given in general, whereby there is the condition that only the position of the finger tip on the surface PAD keyboard 1 is evaluated as the input size for the tone correction.

Wres=resulting White value (RED, GREEN, BLUE)

$R_{cor.}$=correction value Red=f (position of the finger on the switching surface)

$B_{cor.}$=correction value Blue=f (position of the finger on the switching surface)

$G_{cor.}$=correction value Green=f (position of the finger on the switching surface)

Wbas=base value White=f (automatic white balancing)

Wres=Wbas+CORRECTION($R_{cor.}$, $G_{cor.}$, $B_{cor.}$)

The above relationships makes it clear that apart from the preferred linear correction functions, i.e. an essentially linear dependency e.g. of the correction value $R_{cor.}$, on the position of the finger on the switching surface 1, non linear, e.g. logarithmic dependency, may be employed. The latter may be effected in that the control device of the device according to the invention comprises a microprocessor which effects a convertion of the position of the finger tip or likewise on the surface PAD keyboard to the respective correction value in accordance with a certain function. If therewith, the correction functions for RED, GREEN, BLUE are chosen differently, then the adjusting with the chromaticity correction is not effected within the ideal spherical volume V according to FIG. 2.

Figure 4:
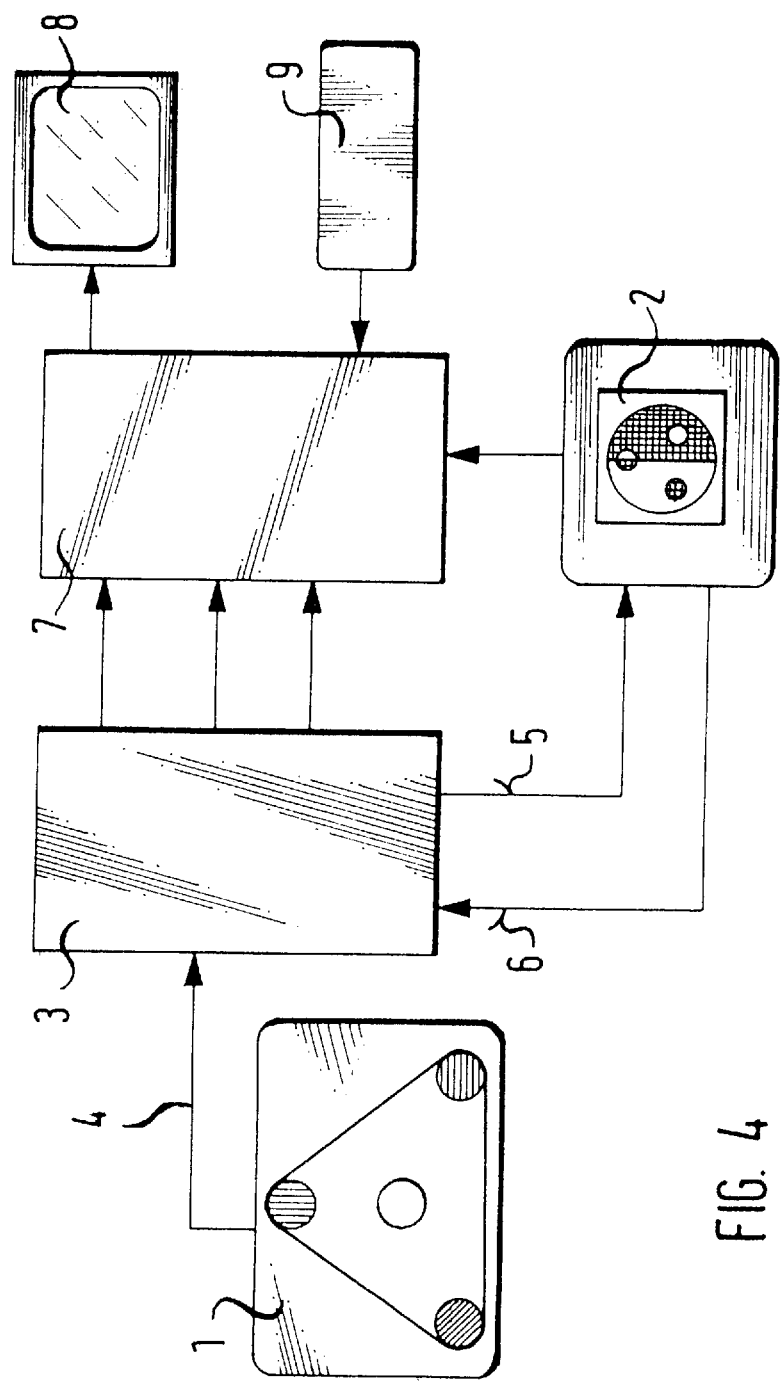

FIG. 4 represents a principle embodiment form of the device according to the invention in the form of a block diagram. The previously described triangular shaped chromaticity correction input key designed as a surface PAD switching surface is indicated at 1. 2 indicates a key for the automatic white balancing. Those signals supplied by the keyboard 1 and the key 2 represent respectively chromaticity correction values 4 and white balancing base values 5 as well as a signal 6 for resetting the correction values. The control device is indicated at 3, and on the input side this receives the chromaticity correction values 4 from the chromaticity correction keyboard 1, and the base values 5 for the white balancing from the white balancing key 2, and translates or converts these values in each case into resulting signals for the automatic white balancing and resulting chromaticity correction values for RED-BLUE-GREEN. The tone correction values determined by the control device 3 are inputted to video electronics 7, to which, on the output side, a video monitor 8 and, on the input side, an endoscope picture sensor 9 of an endoscope camera are connected.

Figure 5:
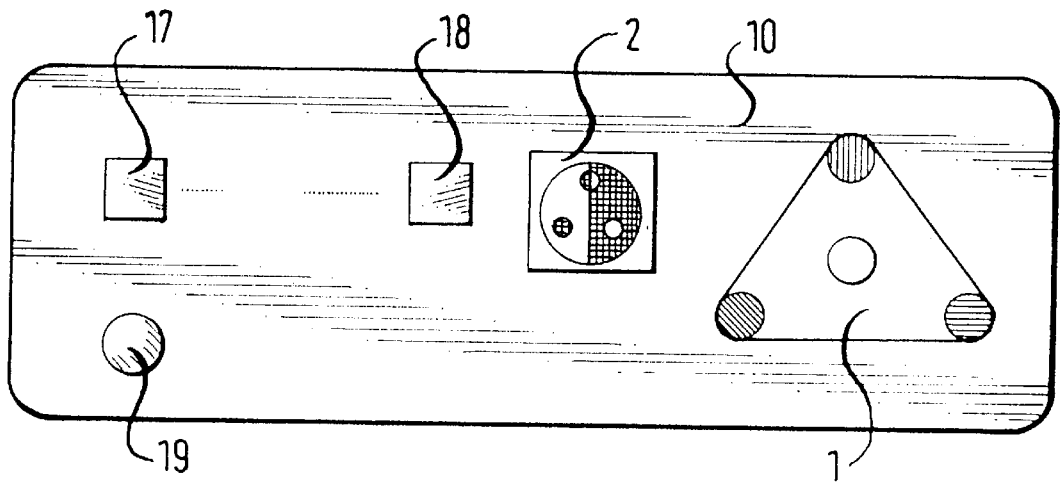

FIG. 5 shows by way of example an operating surface 10 which may for example be situated on a front panel of a video camera and which may comprise the surface PAD keyboard 1, the key 2 for the automatic white balancing as well as other operating elements 17, 18. The operating surface 10 may also be arranged on a video monitor 8.

In the case that the control device 3 of the device according to the invention is a separate apparatus set apart from the monitor 8, and where appropriate together with video electronics, the operating surface 10 additionally comprises a connection 19 for the picture sensor 9.

Figure 6:
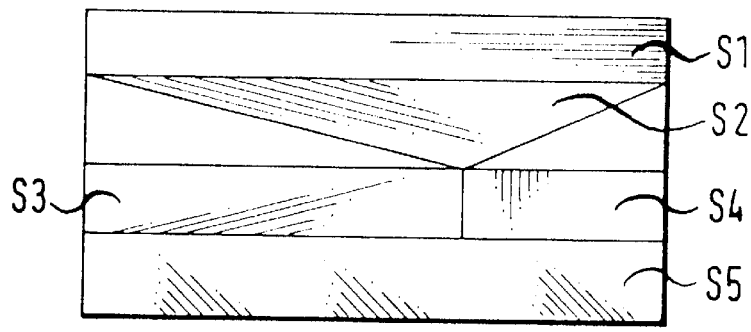

FIG. 6 shows, in the form of a flow diagram, a procedure for initializing the chromaticity correction according to the invention. In the step S1 the camera is activated. Step S2 asks whether an automatic color balancing is to be effected or not. Since the fundamental process for carrying out the automatic white balancing is known, it is not explained any further here.

With each activation of the automatic white balancing AWB the previously inputted and stored chromaticity correction values are deleted and set to ZERO. When the AWB is activated, the automatic white balancing is effected and step S3 assigns the zero point W' of the camera color space to the white point W' of the standard color space, and the surface center of the triangle to the surface PAD keyboard 1. By contacting the surface PAD keyboard 1 at a desired point, a manual chromaticity correction is effected by step S5.

If, in the flow diagram according to FIG. 6, no automatic white balancing is effected, a step S4 comfirms the old setting. In this case a chromaticity correction may be carried out by contacting the surface PAD keyboard 1 at a desired location (step S5).

An essential feature of the invention is the free choice of the chromaticity correction values independently of the color temperature of the recorded object, with the aid of the surface PAD keyboard. The maximum achievable color saturation values, which lie on the surface of the ball segment, are limited to a measure adapted for clinical use. Otherwise the device for chromaticity correction according to the invention may be used with an analog operating video camera as well as a digital video camera.

What is claimed is:

1. A device for correcting the chromaticity of color pictures recorded by a video endoscope camera, said video camera comprising a converter (9) which converts a recorded picture into an electrical color picture signal, and a control device (3) to selectively control the chromaticity of the color picture which is displayed on a monitor (8) and based on the recorded picture, independently of the displayed color picture, wherein the control device (3) comprises means for effecting a free chromaticity correction of three ground colors Red, Green and Blue of the video picture independently of the color temperature of a recorded object, the means for effecting the free chromaticity correction including a contact sensitive, position oriented, essentially planar, triangular-shaped switching surface which is attached to one of the video camera and the monitor (8), the triangular-shaped switching surface having peripheral points which are spaced apart, with each of the ground colors Red, Green and Blue being assigned to one of the peripheral points, the video camera including means (2) for selectively effecting an automatic white balancing (AWB), and the control device, after effecting the white balancing and before effecting the chromaticity correction, assigns the white point to a center of the switching surface which is a zero point of the triangular-shaped switching surface.

2. The device according to claim 1 wherein the switching surface is formed as a triangular surface PAD keyboard with FSR-sensors, and the peripheral points assigned to the colors Red, Green, and Blue are corners of the triangle.

3. The device according to claim 2 wherein the control device (3) comprises a microprocessor in which a function of the chromaticity correction value is determined for each color, with the chromaticity correction effected by the control device being dependent on a location on the surface PAD keyboard which is contacted by a user's finger.

4. The device according to claim 3 wherein the chromaticity correction functions are provided such that the chromaticity correction values are variable within a spherical or ellipsoidal volume segment (V).

5. The device according to claim 1 wherein the center of the switching surface (1) includes a marking indication the white point.

6. The device according to claim 1 wherein display means are functionally connected to the control device (3) for producing a display corresponding to a chromaticity value which is set.

7. The device according to claim 6 wherein the display means are provided on the monitor.

* * * * *